US010037308B2

(12) United States Patent
Brinda et al.

(10) Patent No.: US 10,037,308 B2
(45) Date of Patent: Jul. 31, 2018

(54) METHOD FOR ADDING TWO ROWS OF TILES TO AN EXISTING TWO ROWS OF TILES BASED ON THE NUMBER OF TILES IN EACH OF THE EXISTING TWO ROWS

(71) Applicant: HTC Corporation, Taoyuan (TW)

(72) Inventors: David Brinda, Bellevue, WA (US);
Jesse John Penico, Bellevue, WA (US);
Drew Bamford, Bellevue, WA (US);
Sheng-Hsin Huang, Taoyuan (TW);
Fang-Ju Lin, Taoyuan (TW);
Ying-Jing Wang, Taoyuan (TW);
Pei-Ju Lee, Taoyuan (TW); Peter Chin, Bellevue, WA (US); Wendy Wai Mun Chan, San Francisco, CA (US);
Keng-Yu Chen, Taoyuan (TW);
Shih-Wun Peng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 333 days.

(21) Appl. No.: 14/599,109

(22) Filed: Jan. 16, 2015

(65) Prior Publication Data
US 2015/0205763 A1 Jul. 23, 2015

Related U.S. Application Data

(60) Provisional application No. 61/928,424, filed on Jan. 17, 2014.

(51) Int. Cl.
*G06F 17/00* (2006.01)
*G06F 17/21* (2006.01)
(Continued)

(52) U.S. Cl.
CPC .......... *G06F 17/211* (2013.01); *G06F 3/0485* (2013.01); *H04N 1/00196* (2013.01); *H04N 1/00458* (2013.01)

(58) Field of Classification Search
CPC ............ G06F 17/211; G06F 17/30011; G06F 17/248; G06F 17/212; G06F 17/3089;
(Continued)

(56) References Cited

U.S. PATENT DOCUMENTS

| | | | |
|---|---|---|---|
| 6,320,602 B1 * | 11/2001 | Burkardt ............... | G06F 9/4443 715/817 |
| 2003/0072486 A1 * | 4/2003 | Loui ...................... | G06T 11/60 382/175 |

(Continued)

OTHER PUBLICATIONS

Zabir, O.A.,"DropTiles—Metro style Live Tiles powered Web Dashboard," © Jul. 18, 2012, Code Project website, 11 pages.*

*Primary Examiner* — Cesar Paula
*Assistant Examiner* — James H Blackwell
(74) *Attorney, Agent, or Firm* — Birch, Stewart, Kolasch & Birch, LLP

(57) ABSTRACT

A method for updating a page of an electronic device is provided. The page includes a first row and a second row. Each of the first row and the second row includes one or two tiles. Each tile comprises a picture. The method comprises the following steps. After an update that results in insertion of a plurality of new tiles into the page occurs, three new tiles of the plurality of new tiles are displayed by using either a first tile layout or a second tile layout in a third row and a fourth row. The number of tiles in the third row is one and the number of tiles in the fourth row is two in the first tile layout. The number of tiles in the third row is two and the number of tiles in the fourth row is one in the second tile layout.

15 Claims, 10 Drawing Sheets

(51) Int. Cl.
*G06F 3/0485* (2013.01)
*H04N 1/00* (2006.01)

(58) Field of Classification Search
CPC .............. G06F 3/0485; G06F 3/04886; H04N 1/00196; H04N 1/00458
See application file for complete search history.

(56) References Cited

U.S. PATENT DOCUMENTS

| | | | |
|---|---|---|---|
| 2006/0053370 A1* | 3/2006 | Hitaka | G11B 27/034 |
| | | | 715/251 |
| 2006/0200758 A1* | 9/2006 | Atkins | G06T 11/60 |
| | | | 715/209 |
| 2007/0019924 A1* | 1/2007 | Teo | H04N 1/00132 |
| | | | 386/278 |
| 2007/0208996 A1* | 9/2007 | Berkner | G06F 17/212 |
| | | | 715/210 |
| 2008/0082912 A1* | 4/2008 | Atkins | H04N 1/3872 |
| | | | 715/243 |
| 2008/0215985 A1* | 9/2008 | Batchelder | G06F 17/248 |
| | | | 715/731 |
| 2008/0313533 A1* | 12/2008 | Hoyer | G06F 17/211 |
| | | | 715/243 |
| 2009/0024914 A1* | 1/2009 | Chen | H04N 1/00132 |
| | | | 715/230 |
| 2012/0278704 A1* | 11/2012 | Ying | G06F 17/2247 |
| | | | 715/243 |

\* cited by examiner

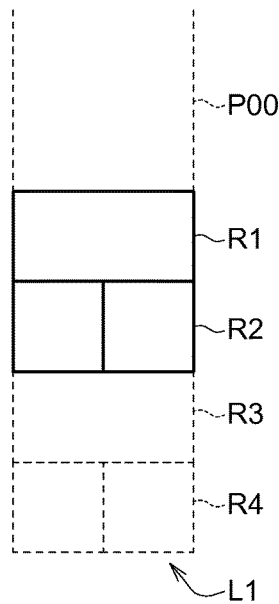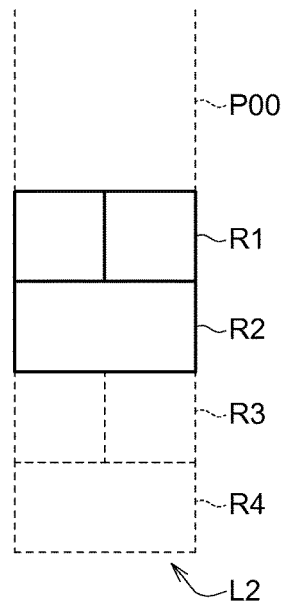
FIG. 3A  FIG. 3B
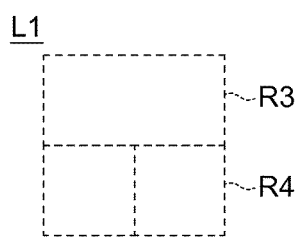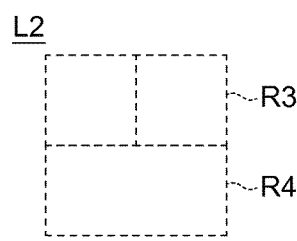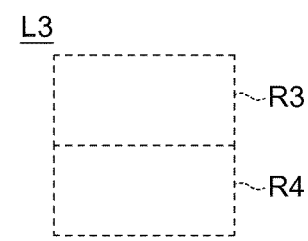
FIG. 4A  FIG. 4B  FIG. 4C
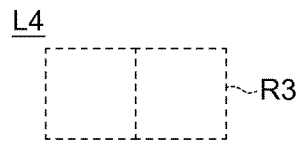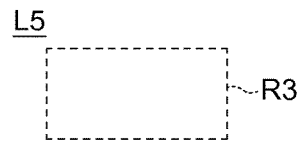
FIG. 4D  FIG. 4E

METHOD FOR ADDING TWO ROWS OF TILES TO AN EXISTING TWO ROWS OF TILES BASED ON THE NUMBER OF TILES IN EACH OF THE EXISTING TWO ROWS

This application claims the benefit of U.S. provisional application Ser. No. 61/928,424, filed Jan. 17, 2014, the disclosure of which is incorporated by reference herein in its entirety.

TECHNICAL FIELD

The disclosure relates in general to a processing method, and more particularly to a method for updating a page of an electronic device.

BACKGROUND

As the development of technology, varied electronic devices are invented. For example, smart phones, tablet computers or notebook computers are widely used in the life. Some information can be shown on a page of those electronic devices for people to read. Those information contained pictures or text may be shown on the page by several ways. It is a target to make the page being interesting and comfortable for reading.

SUMMARY

The disclosure is directed to a method for updating a page of an electronic device.

According to one embodiment, a method for updating a page of an electronic device is provided. The page is updated by a processor and displayed on a display panel of the electronic device. The page includes a first row and a second row. The first row is adjacent to one side the second row. The first row includes one or two tiles. The second row includes one or two tiles. Each tile comprises a picture. The method comprises the following steps. After an update that results in insertion of a plurality of new tiles into the page occurs, three new tiles of the plurality of new tiles are displayed by using either a first tile layout or a second tile layout in a third row and a fourth row. The third row is adjacent to another side of the second row opposite the one side of the second row. The second row is adjacent to one side of the third row. The fourth row is adjacent to another side of the third row opposite the one side of the third row. The number of tiles in the third row is one and the number of tiles in the fourth row is two in the first tile layout. The number of tiles in the third row is two and the number of tiles in the fourth row is one in the second tile layout.

BRIEF DESCRIPTION OF THE DRAWINGS

FIGS. 3A and 3B show two embodiments of the method in FIG. 2.

FIG. 4A shows a first tile layout.
FIG. 4B shows a second tile layout.
FIG. 4C shows a third tile layout.
FIG. 4D shows a fourth tile layout.
FIG. 4E shows a fifth tile layout.

Figure 1:
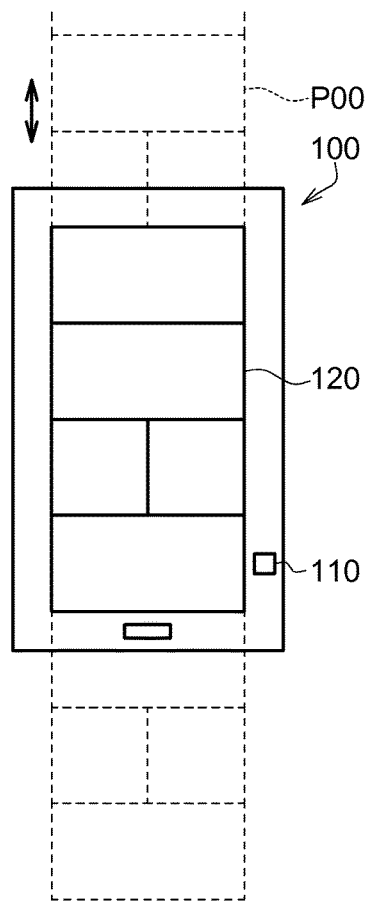
FIG. 1 shows an electronic device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows an electronic device 100. The electronic device 100 may be a smart phone, a tablet computer or a notebook computer. The electronic device 100 includes a processor 110 and a display panel 120. The processor 110 is used for performing a plurality of calculating processes, a plurality of analyzing processes or a plurality of image processing processes. For example, the processor 110 may be a chip, a circuit board, a storage device storing a plurality of program codes or a circuit. The display panel 120 is used for displaying a plurality of information, such as images or texts. For example, the display panel 120 may be a liquid crystal display (LCD) panel, an organic light emitting diode (OLED) panel or an electronic paper. A page P00 including a plurality of pictures can be shown on the display panel 120. The page P00 may be a long strip which includes a plurality of rows. Each row includes one tile or two tiles. Each tile includes one picture. The user can slide the page P00 towards up or down. The page P00 can be updated to insert some new tiles. The newly inserted tiles may be disposed at the bottom of the page P00 or the top of the page P00.

Figure 2:
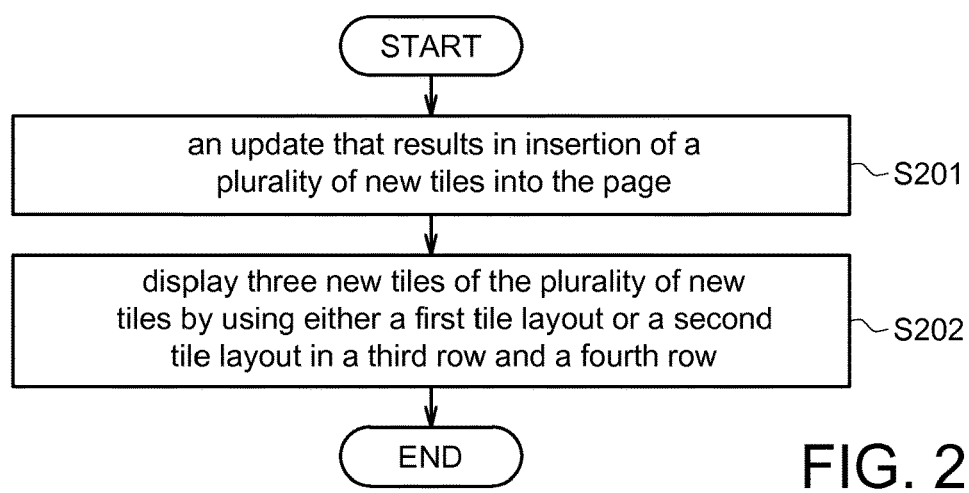
FIG. 2 illustrates a flowchart of a method for updating the page of the electronic device.

Please referring to FIGS. 1 to 3B, FIG. 2 illustrates a flowchart of a method for updating the page P00 of the electronic device 100, and FIGS. 3A and 3B show two embodiments of the method in FIG. 2. As shown in FIG. 1, the page P00 can be updated by the processor 110 and displayed on the display panel 120 of the electronic device 100. As shown in FIGS. 3A and 3B, the page P00 includes a first row R1 and a second row R2. The first row R1 is adjacent to one side the second row R2. The first row R1 includes one or two tiles, and the second row R2 includes one or two tiles. For example, in FIG. 3A, the first row R1 includes one tile and the second row R2 includes two tiles. In FIG. 3B, the first row R1 includes two tiles and the second row R2 includes one tile.

In step S201, an update that results in insertion of a plurality of new tiles into the page P00 occurs. For example, as shown in FIGS. 3A and 3B, the page P00 is going to be undated by inserting three new tiles.

In step S202, the processor 110 controls the display panel 120 to display three new tiles of the plurality of new tiles by using either a first tile layout L1 or a second tile layout L2 in a third row R3 and a fourth row R4. As shown in FIGS. 3A and 3B, the third row R3 is adjacent to another side of the second row R2 opposite the one side of the second row R2. The second row R2 is adjacent to one side of the third row R3. The fourth row R4 is adjacent to another side of the third row R3 opposite the one side of the third row R3. As shown in FIG. 3A, the number of tiles in the third row R3 is one and the number of tiles in the fourth row R4 is two in the first tile layout L1. As shown in FIG. 3B, the number of tiles in the third row R3 is two and the number of tiles in the fourth row R4 is one in the second tile layout L2.

By repeatedly performing the step S202, each set of three tiles can be inserted into the page P00 by using the first tile layout L1 (shown in FIG. 3A) or the second tile layout L2 (shown in FIG. 3B).

Please referring to FIGS. 4A to 4E, FIG. 4A shows the first tile layout L1, FIG. 4B shows the second tile layout L2, FIG. 4C shows a third tile layout L3, FIG. 4D shows a fourth tile layout L4, and FIG. 4E shows a fifth tile layout L5. The first tile layout L1 and the second tile layout L2 are used for inserting three tiles. The third tile layout L3 and the fourth tile layout L4 are used for inserting two tiles. The fifth tile layout L5 is used for inserting one tile. As shown in FIG. 4A, the number of tiles in the third row R3 is one and the number of tiles in the fourth row R4 is two in the first tile layout L1. As shown in FIG. 4B, the number of tiles in the third row R3 is two and the number of tiles in the fourth row R4 is one in the second tile layout L2. As shown in FIG. 4C, the number of tiles in the third row R3 is one and the number of tiles in the fourth row R4 is one in the third tile layout L3. As shown in FIG. 4D, the number of tiles in the third row R3 is two in the fourth tile layout L4. As shown in FIG. 4E, the number of the tile in the third row R3 is one in the fifth tile layout L5.

The first tile layout L1 to the fifth tile layout L5 are selected based on the number of tiles to be inserted. For example, if the number of the tiles to be inserted is 6, then two sets of three tiles can be inserted by using the first tile layout L1 or the second tile layout L2. If the number of the tiles to be inserted is 5, then after one set of three tiles is inserted, two tiles can be inserted by using the third tile layout L3 or the fourth tile layout L4. If the number of the tiles to be inserted is 7, then after two sets of three tiles are inserted, one tile can be inserted by using the fifth tile layout L5.

Figure 5A:
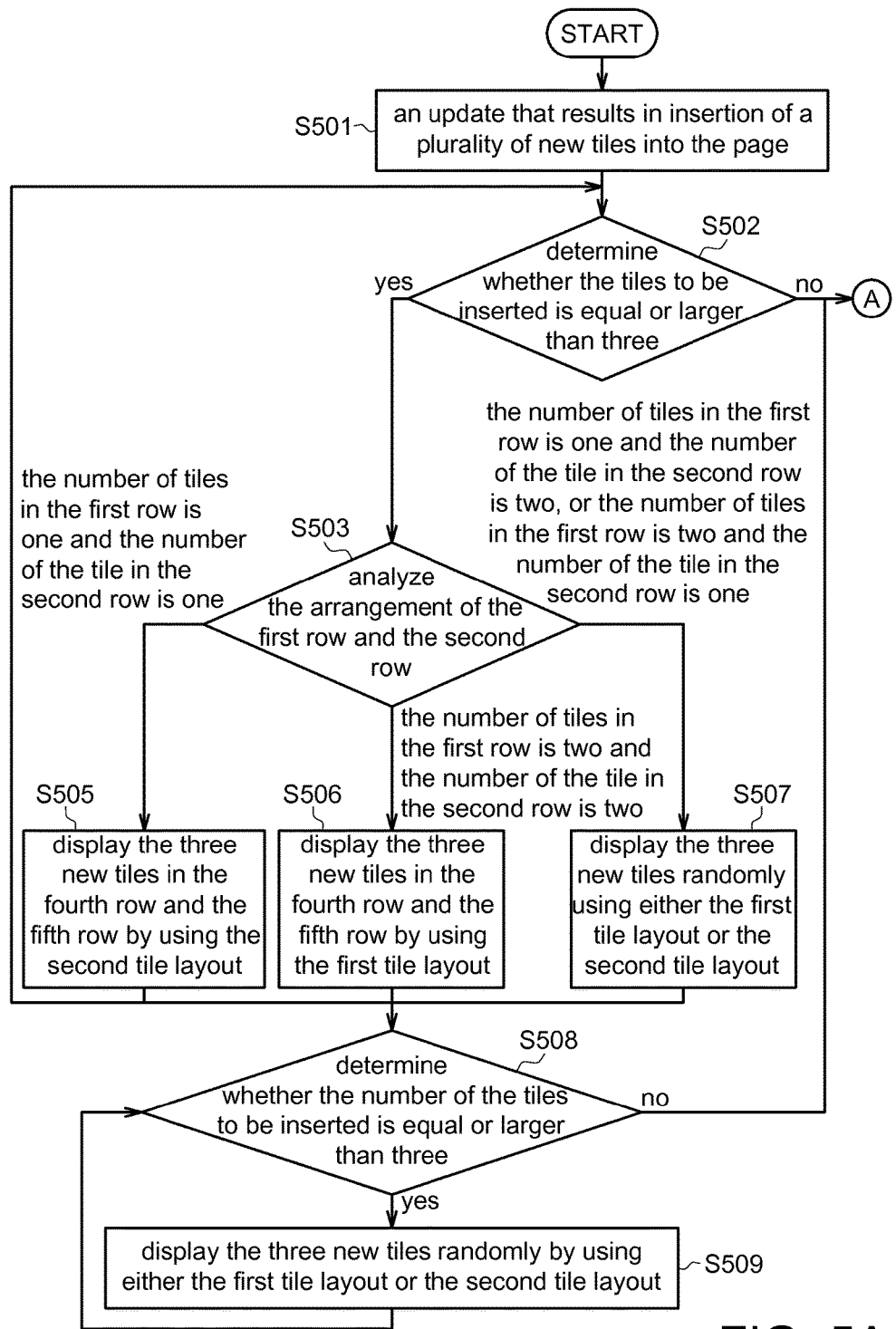
FIGS. 5A and 5B illustrate a flowchart of a method for updating the page of the electronic device according to another embodiment.
Figure 5B:
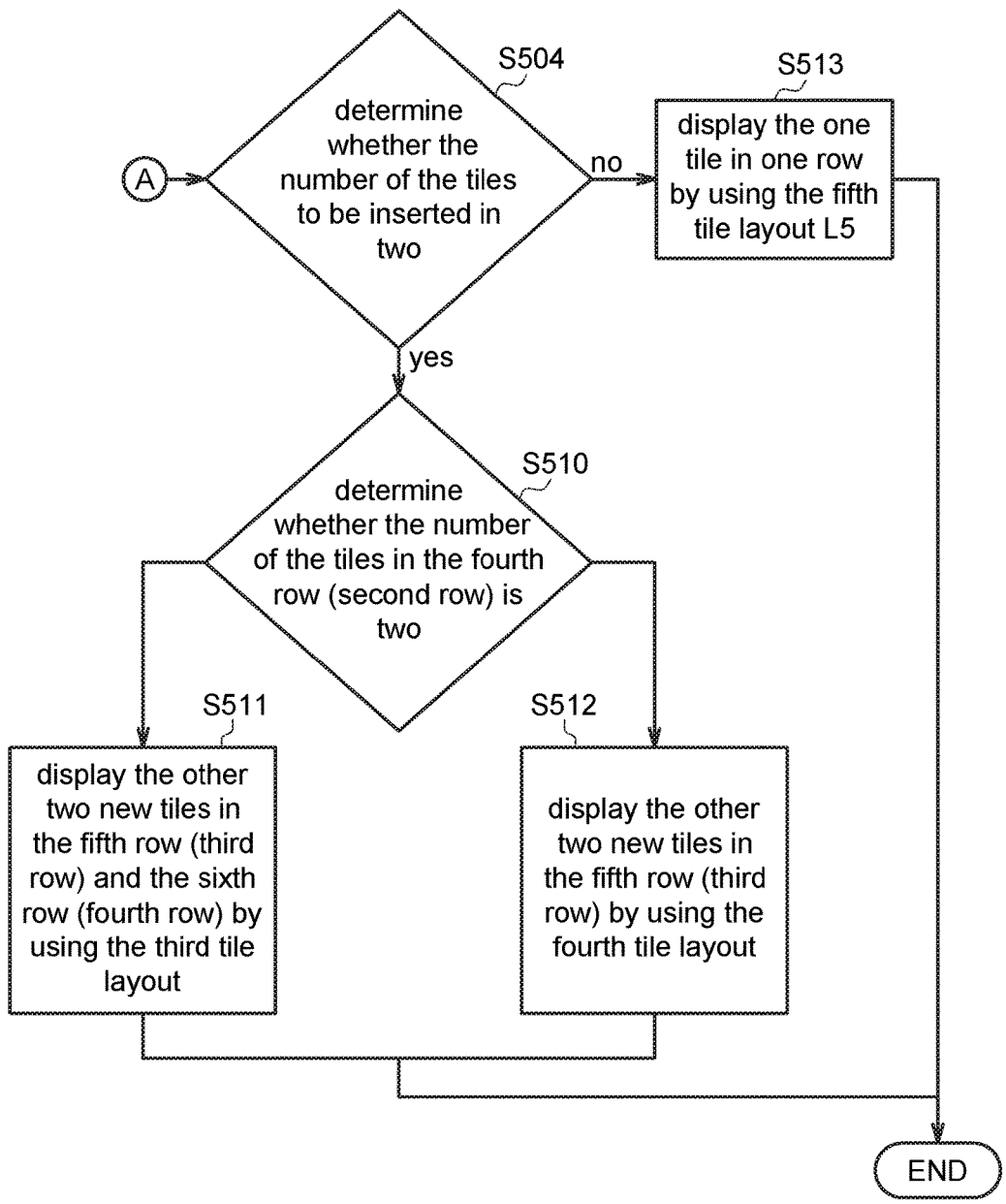

Please referring to FIGS. 5A, 5B and 7 to 13, FIGS. 5A to 5B illustrate a flowchart of a method for updating the page P00 of the electronic device 100 according to another embodiment, and FIGS. 7 to 13 illustrate the examples of steps in FIGS. 5A and 5B. In this embodiment, the arrangement of the tiles is complied with a first rule and a second rule.

Figure 6A:
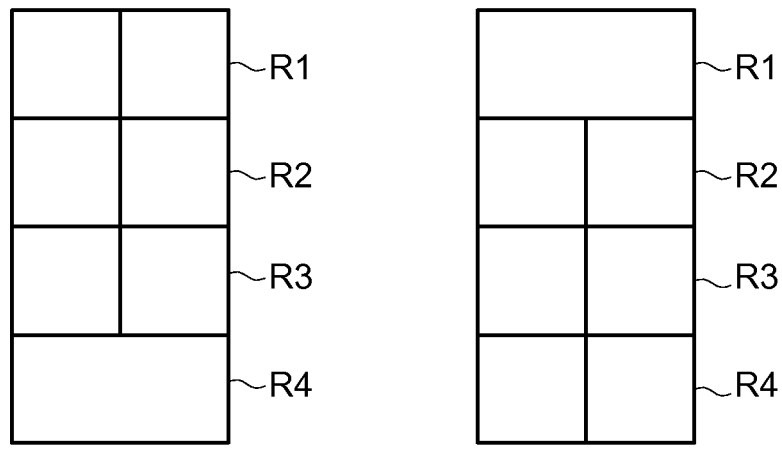
FIG. 6A shows several wrong examples which are not satisfied a first rule.

In the first rule, the number of the adjacent rows, where the number of tiles is two, cannot be larger than two. Please referring to FIG. 6A, several wrong examples which are not satisfied the first rule are shown. In the left of FIG. 6A, the number of the adjacent rows R1, R2, R3, where the number of tiles is two, is 3. In the right of FIG. 6A, the number of the adjacent rows R2, R3, R4, where the number of tiles is two, is 3.

Figure 6B:
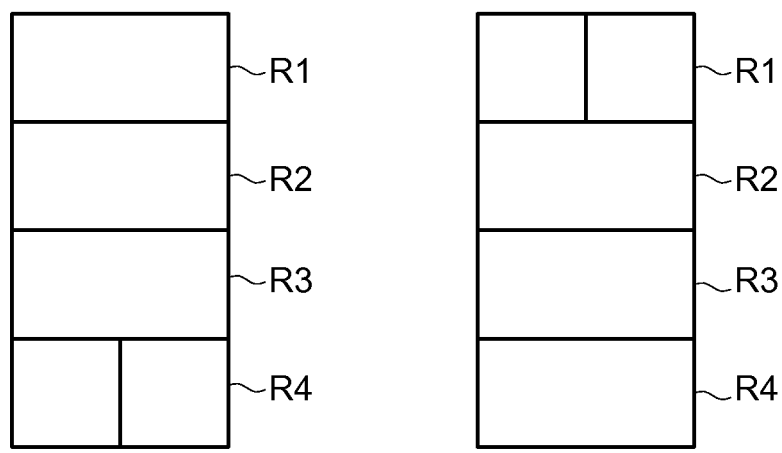
FIG. 6B shows several wrong examples which are not satisfied a second rule.

In the second rule, the number of the adjacent rows, where the number of tiles is one, cannot be larger than two. Please referring to FIG. 6B, several wrong examples which are not satisfied the second rule are shown. In the left of FIG. 6B, the number of the adjacent rows R1, R2, R3, where the number of tiles is one, is 3. In the right of FIG. 6B, the number of the adjacent rows R2, R3, R4, where the number of tiles is one, is 3.

In step S501, an update that results in insertion of a plurality of new tiles into the page occurs.

In step S502, the processor 110 determines whether number of the tiles to be inserted is equal or larger than three. If the number of the plurality of new tiles to be inserted is equal to or larger than three, then the process proceeds to step S503; if the number of the plurality of new tiles to be inserted is not equal to or larger than three, then the process proceeds to step S504.

Figure 7:
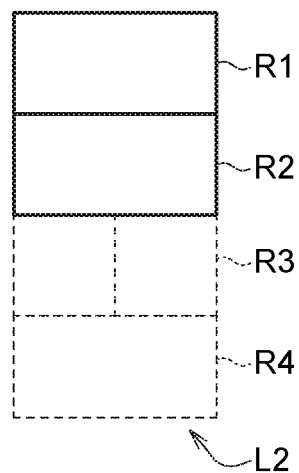
FIGS. 7 to 13 illustrate the examples of steps in FIG. 5.
Figure 8:
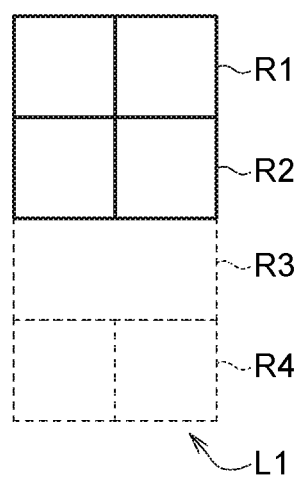
Figure 9A:
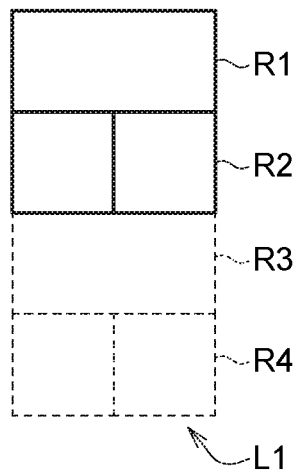
Figure 9B:
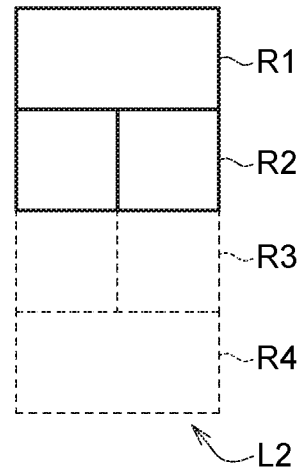
Figure 10A:
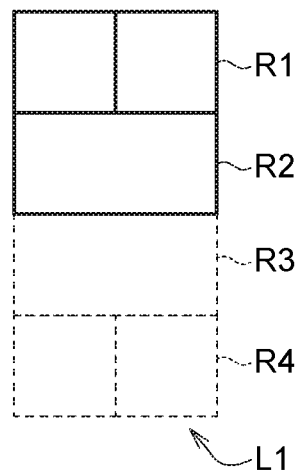
Figure 10B:
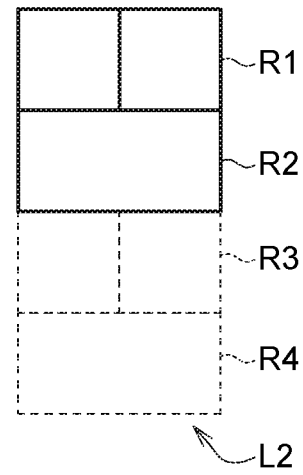
Figure 11A:
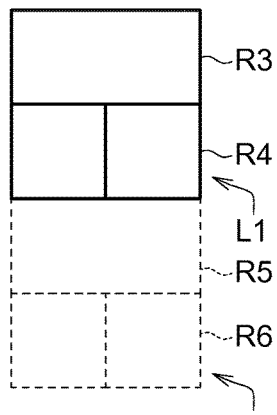
Figure 11B:
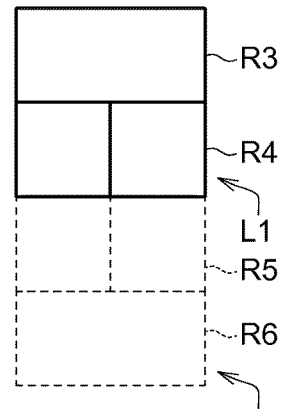
Figure 11C:
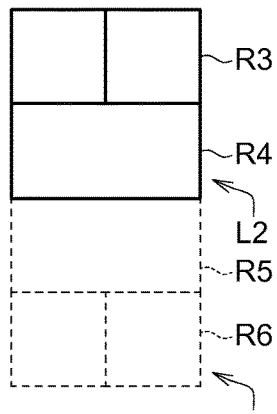
Figure 11D:
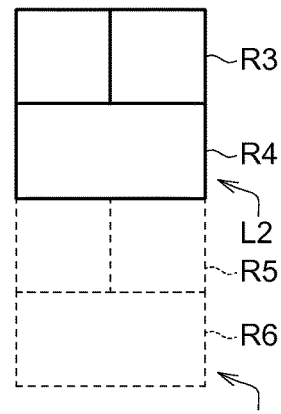

In step S503, the processor 110 analyzes the arrangement of the first row R1 and the second row R2. Then, the process proceeds to step S505, step S506 or step S507. For example, as shown in FIG. 7, if the number of tiles in the first row R1 is one and the number of the tile in the second row R2 is one, then the process proceeds to step S505. As shown in FIG. 8, if the number of tiles in the first row R1 is two and the number of the tile in the second row R2 is two, then the process proceeds to step S506. As shown in FIGS. 9A to 10B, if the number of tiles in the first row R1 is one and the number of the tile in the second row R2 is two, or the number of tiles in the first row R1 is two and the number of the tile in the second row R2 is one, then the process proceeds to step S507.

In step S505, as shown in FIG. 7, the processor 110 controls the display panel 120 to display the three new tiles in the third row R3 and the fourth row R4 by using the second tile layout L2. In this step, due to the second rule, the processor 110 will not controls the display panel 120 to display the three new tiles in the third row R3 and the fourth row R4 by using the first tile layout L1.

In step S506, as shown in FIG. 8, the processor 110 controls the display panel 120 to display the three new tiles in the third row R3 and the fourth row R4 by using the first tile layout L1. In this step, due to the first rule, the processor 110 will not controls the display panel 120 to display the three new tiles in the third row R3 and the fourth row R4 by using the second tile layout L2.

In step S507, as shown in FIGS. 9A to 10B, the processor 110 controls the display panel 120 to display the three new tiles randomly using either the first tile layout L1 or the second tile layout L2.

Next, in step S508, the processor 110 determines whether the number of the tiles to be inserted is equal or larger than three. If the number of the tiles to be inserted is equal or larger than three, then the process proceeds to step S509; if the number of the tiles to be inserted is not equal or larger than three, then the process proceeds to step S504.

In step S509, as shown in FIGS. 11A to 11D, the processor 110 controls the display panel 120 to display the three new tiles randomly by using either the first tile layout L1 or the second tile layout L2. In this step, the first tile layout L1 and the second tile layout L2 are randomly used in the third row R3 to the sixth row R6. The number of the adjacent rows, where the number of tiles is two, will not be larger than two, so the first rule can be satisfied. The number of the adjacent rows, where the number of tiles is one, will not be larger than two, so the second rule can be satisfied.

In step S504, the processor 110 determines whether the number of the tiles to be inserted is two. If the number of the tiles to be inserted is two, then the process proceeds to step S510; if the number of the tiles to be inserted is not two, then the process proceeds to step S513.

In step S510, the processor 110 determines whether the number of the tiles in the fourth row is two. If the number of the tiles in the fourth row R4 is two, then the process proceeds to step S511; if the number of the tiles in the fourth row R4 is not two, then the process proceeds to step S512.

Figure 12:
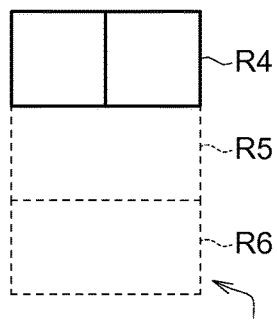

In step S511, as shown in FIG. 12, the processor 110 controls the display panel 120 to display the other two new tiles in the fifth row R5 and the sixth row R6 by using the third tile layout L3.

Figure 13:
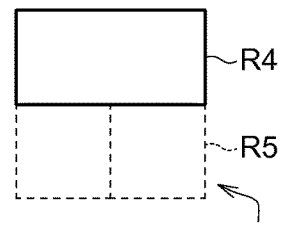

In step S512, as shown in FIG. 13, the processor 110 controls the display panel 120 to display the other two new tiles in the fifth row R5 by using the fourth tile layout L4.

In this process, after the step S502 is performed, the process may proceeds to step S504, S510 to S512 directly. In this case, the steps S510 to S512 may be changed as follows.

In step S510, the processor 110 determines whether the number of the tiles in the second row R2 is two. If the number of the tiles in the second row R2 is two, then the process proceeds to step S511; if the number of the tiles in the second row R2 is not two, then the process proceeds to step S512.

In step S511, the processor 110 controls the display panel 120 to display the two new tiles in the third row R3 and the fourth row R4 by using the third tile layout L3.

In step S512, the processor 110 controls the display panel 120 to display the two new tiles in the third row R3 by using the fourth tile layout L4.

In step S513, only one tile is needed to be inserted, and the processor 110 controls the display panel 120 to display the one tile in one row by using the fifth tile layout L5.

Figure 14:
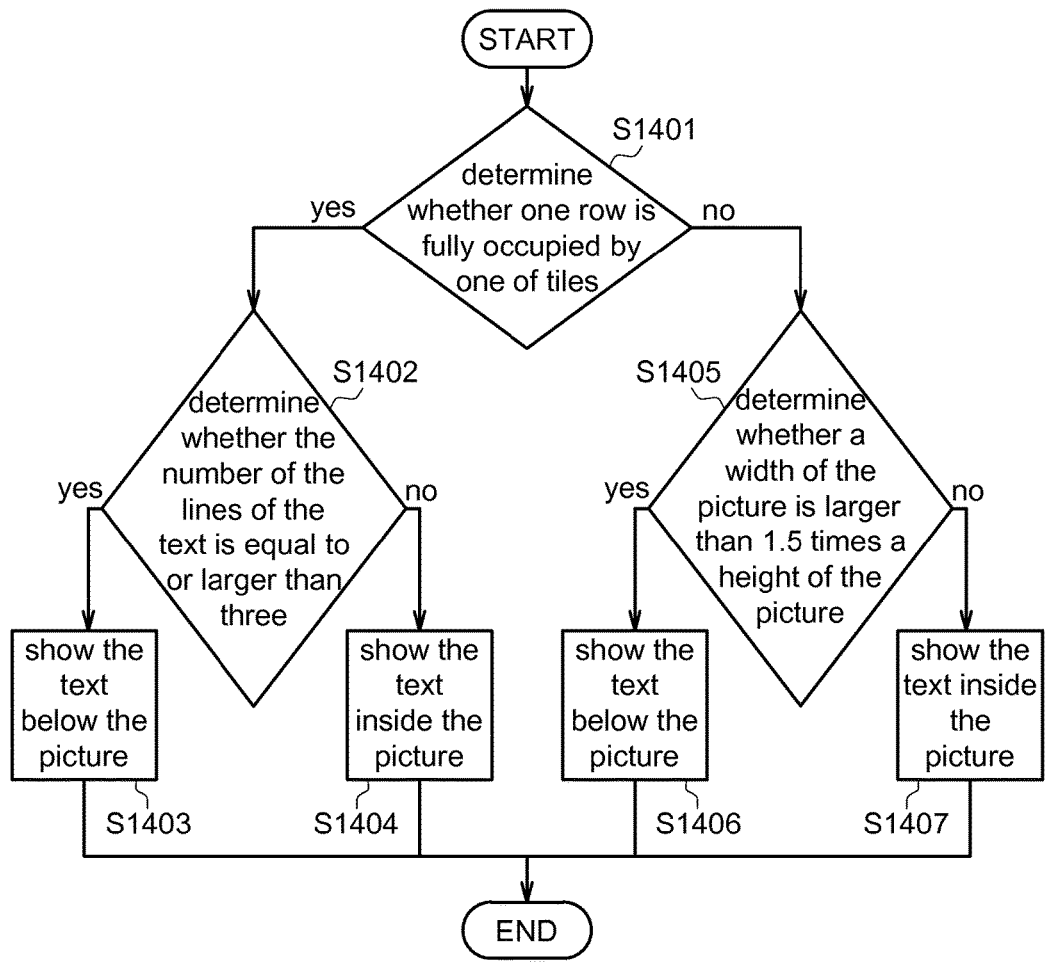
FIG. 14 shows a flow chart of a method for showing a text on the tile.

Further, please referring to FIGS. 14 to 16B, FIG. 14 shows a flow chart of a method for showing a text T on the tile, and FIGS. 15A to 16B show examples of the steps in FIG. 14. In step S1401, the processor 110 determines whether one row is fully occupied by one of tiles. If the row is fully occupied by one of tiles, then the process proceeds to step S1402; if the row is not fully occupied by one of tiles, then the process proceeds to step S1405.

In step S1402, the processor 110 determines whether the number of the lines of the text T is equal to or larger than three. If the number of the lines of the text T is equal to or larger than three, then the process proceeds to step S1403; if the number of the lines of the text T is not equal to or larger than three, then the process proceeds to step S1404.

Figure 15A:
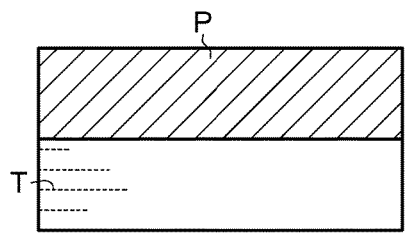
FIGS. 15A to 16B show examples of the steps in FIG. 14.

In step S1403, as shown in FIG. 15A the processor 110 controls the display panel 120 to show the text T below the picture P.

Figure 15B:
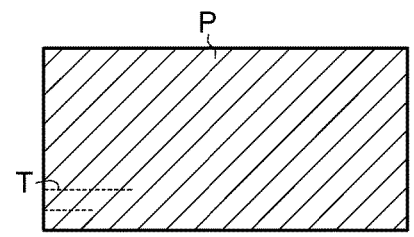

In step S1404, as shown in FIG. 15B, the processor 110 controls the display panel 120 to show the text T inside the picture P.

In step S1405, the processor 110 determines whether a width of the picture P is larger than 1.5 times a height of the picture P. If the width of the picture P is larger than 1.5 times the height of the picture P, then the process proceeds to step S1406; if the width of the picture P is not larger than 1.5 times the height of the picture P, then the process proceeds to step S1407.

Figure 16A:
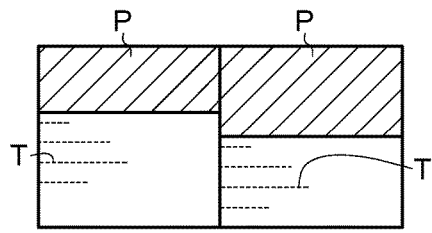
Figure 16B:
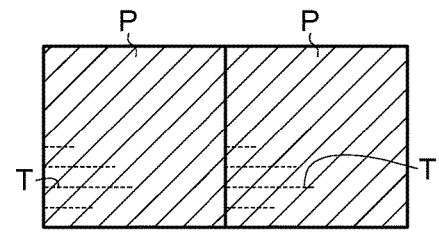

In step S1406, as shown in FIG. 16A, the processor 110 controls the display panel 120 to show the text T below the picture P.

In step S1407, as shown in FIG. 14B, the processor 110 controls the display panel 120 to show the text T inside the picture P.

Base on above, the page P00 of the electronic device 100 can be updated in an artistic way. Reading the content shown on the page P00 is interesting and comfortable.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for updating a page of an electronic device, the page being updated by a processor and displayed on a display panel of the electronic device, wherein the page includes a first row and a second row, the first row is adjacent to one side the second row, the first row includes one or two tiles, the second row includes one or two tiles, and the method comprises:
   updating the page with the received update events by inserting a plurality of new tiles into the page, wherein each new tile including at least a text for describing one of the received updated event; and
   displaying three new tiles by using either a first tile layout or a second tile layout in a third row and a fourth row, wherein the third row is adjacent to another side of the second row opposite the one side of the second row, the second row is adjacent to one side of the third row, the fourth row is adjacent to another side of the third row opposite the one side of the third row, the number of tiles in the third row is one and the number of tiles in the fourth row is two in the first tile layout, and the number of tiles in the third row is two and the number of tiles in the fourth row is one in the second tile layout,
   wherein the step of displaying three new tiles by using either a first tile layout or a second tile layout in a third row and a fourth row comprises:
   determining the number of tiles in the first row and the number of the tiles in the second row;
   in response to determining the number of tiles in the first row is one and the number of the tile in the second row is one, displaying the three new tiles by using the second tile layout;
   in response to determining the number of tiles in the first row is two and the number of the tile in the second row is two, displaying the three new tiles by using the first tile layout; and
   in response to determining the number of tiles in the first row is one and the number of the tile in the second row is two or if the number of tiles in the first row is two and the number of the tile in the second row is one, displaying the three new tiles by using either the first tile layout or the second tile layout.

2. The method according to claim 1, wherein the step of displaying the three new tiles by using either the first tile layout or the second tile layout is based on either a determination that the number of tiles in the first row is one and the number of the tiles in the second row is two, or a determination that the number of tiles in the first row is two and the number of the tiles in the second row is one.

3. The method according to claim 1, wherein the step of displaying the three new tiles by using either the first tile layout or the second tile layout is further based on the number of the plurality of new tiles to be inserted.

4. The method according to claim 3, wherein the step of displaying the three new tiles by using either the first layout or the second tile layout is based on a determination that the number of the plurality of new tiles to be inserted is equal to or larger than three.

5. The method according to claim 1, further comprising:
   after the update that results in insertion of the plurality of new tiles into the page occurs, displaying other three new tiles in a fifth row and a sixth row by using either the first tile layout or the second tile layout no matter how many tiles in the fourth row, wherein the third row is adjacent to one side the fourth row, the fifth row is adjacent to another side of the fourth row opposite the one side of the fourth row, the fourth row is adjacent to one side of the fifth row, the sixth row is adjacent to another side of the fifth row opposite the one side of the fifth row.

6. The method according to claim 5, wherein the step of displaying the other three new tiles in the fifth row and the sixth row by using either the first layout or the second tile layout is based on a determination that the number of the plurality of new tiles to be inserted is equal to or larger than three.

7. The method according to claim 1, further comprising:
after the update that results in insertion of the plurality of new tiles into the page occurs, displaying other two new tiles by using either a third tile layout in a fifth row and a sixth row, or a fourth tile layout in the fifth row, wherein the third row is adjacent to one side the fourth row, the fifth row is adjacent to another side of the fourth row opposite the one side of the fourth row, the fourth row is adjacent to one side of the fifth row, the sixth row is adjacent to another side of the fifth row opposite the one side of the fifth row, the number of tiles in the fifth row is one and the number of tiles in the sixth row is one in the third tile layout, and the number of tiles in the fifth row is two in the fourth tile layout.

8. The method according to claim 7, wherein the step of displaying the other two new tiles by using either the third tile layout or the fourth tile layout is based on the number of tiles in the fourth row.

9. The method according to claim 8, wherein the step of displaying the other two new tiles by using either the third tile layout or the fourth tile layout based on the number of tiles in the fourth row includes:
displaying the other two new tiles in the fifth row and the sixth row by using the third tile layout, if the number of tiles in the fourth row is two; and
displaying the other two new tiles in the fifth row by using the fourth tile layout, if the number of tiles in the fourth row is one.

10. The method according to claim 8, wherein the step of displaying the other two new tiles by using either the third tile layout or the fourth tile layout is further based on the number of the other the plurality of new tiles to be inserted.

11. The method according to claim 10, wherein the step of displaying the other two new tiles by using either the third tile layout or the fourth tile layout is based on a determination that the number of the other the plurality of new tiles to be inserted is equal to two.

12. The method according to claim 1, wherein each tile further comprises a text, the method further comprises:
showing the text below the picture, if the third row is fully occupied by one of tiles and a number of lines of the text is equal to or larger than three.

13. The method according to claim 1, wherein each tile further comprises a text, the method further comprises:
showing the text inside the picture, if the third row is fully occupied by two of the tiles and a number of lines of the text is less than three.

14. The method according to claim 1, wherein each tile further comprises a text, the method further comprises:
showing the text below the picture, if the third row is fully occupied by two of the tiles and a width of the picture is larger than 1.5 times a height of the picture.

15. The method according to claim 1, wherein each tile further comprises a text, the method further comprises:
showing the text inside the picture, if the third row is fully occupied by two of the tiles and a width of the picture is not larger than 1.5 times a height of the picture.

\* \* \* \* \*